United States Patent
Scharfe et al.

(10) Patent No.: US 7,015,270 B2
(45) Date of Patent: Mar. 21, 2006

(54) CATIONIC MIXED-OXIDE DISPERSION, COATING PIGMENT AND INK-ABSORBING MEDIUM

(75) Inventors: Thomas Scharfe, Alzenau (DE); Christoph Batz-Sohn, Hanau-Mittelbuchen (DE); Wolfgang Lortz, Waechtersbach (DE)

(73) Assignee: Degussa AG, Duesseldorf (DE)

( * ) Notice: Subject to any disclaimer, the term of this patent is extended or adjusted under 35 U.S.C. 154(b) by 47 days.

(21) Appl. No.: 10/350,954

(22) Filed: Jan. 27, 2003

(65) Prior Publication Data

US 2004/0034144 A1 Feb. 19, 2004

(30) Foreign Application Priority Data

Jan. 26, 2002 (DE) .............................. 102 03 047

(51) Int. Cl.
C08K 3/36 (2006.01)
C08K 3/22 (2006.01)
C08L 39/00 (2006.01)
B41M 5/50 (2006.01)

(52) U.S. Cl. .................... 524/492; 524/430; 524/493; 524/555; 428/32.34; 428/32.38

(58) Field of Classification Search ............... 524/430, 524/492, 493, 555, 557; 428/32.29, 32.3, 428/32.34, 32.37, 32.38
See application file for complete search history.

(56) References Cited

U.S. PATENT DOCUMENTS

| 4,391,850 | A | * | 7/1983 | Shanton | ..................... 503/225 |
|---|---|---|---|---|---|
| 5,380,687 | A | * | 1/1995 | Mangold et al. | ............. 501/128 |
| 5,866,638 | A | * | 2/1999 | Shimomura et al. | ......... 523/161 |
| 5,998,543 | A | * | 12/1999 | Collins et al. | .............. 524/808 |
| 6,436,513 | B1 | * | 8/2002 | Kitamura et al. | ......... 428/32.25 |
| 6,502,935 | B1 | * | 1/2003 | Barcock et al. | ............. 347/105 |
| 6,623,820 | B1 | * | 9/2003 | Nakahara et al. | ......... 428/32.37 |
| 6,808,769 | B1 | | 10/2004 | Batz-Sohn et al. | |
| 2003/0095905 | A1 | | 5/2003 | Scharfe et al. | |
| 2003/0191226 | A1 | * | 10/2003 | Chapman et al. | ........... 524/493 |
| 2004/0121094 | A1 | * | 6/2004 | Aert et al. | ................ 428/32.1 |
| 2005/0169861 | A1 | | 8/2005 | Lortz et al. | |

FOREIGN PATENT DOCUMENTS

| DE | 195 34 327 | 2/1996 |
|---|---|---|
| DE | 101 35 452 | 2/2003 |
| EP | 993962 A1 * | 4/2000 |

OTHER PUBLICATIONS

Patent Abstracts of Japan, JP 2001-207078, Jul. 31, 2001.
Patent Abstracts of Japan, JP 2001-080204, Mar. 27, 2001.

* cited by examiner

*Primary Examiner*—Callie Shosho
(74) *Attorney, Agent, or Firm*—Oblon, Spivak, McClelland, Maier & Neustadt, P.C.

(57) ABSTRACT

A stable, aqueous dispersion, which includes:
silicon dioxide mixed-oxide particles dispersed in at least one water-soluble cationic polymer having a mass average molar mass of less than 100,000 g/mol, said mixed-oxide including aluminum oxide or titanium dioxide,
wherein said particles are produced by flame hydrolysis,
wherein said particles have a BET specific surface area of 5 to 600 $m^2/g$ and a negative zeta potential,
and wherein the dispersion has a positive zeta potential.

19 Claims, 2 Drawing Sheets

CATIONIC MIXED-OXIDE DISPERSION, COATING PIGMENT AND INK-ABSORBING MEDIUM

BACKGROUND OF THE INVENTION

1. Field of the Invention

The invention relates to an aqueous dispersion containing silicon dioxide mixed-oxide produced by flame hydrolysis and a cationic polymer, a coating pigment that contains this dispersion and an ink jet absorbing medium produced with it.

2. Discussion of the Background

The use of silicon dioxide-containing aqueous dispersions for the production of coating pigments for ink-absorbing layers in the inkjet field is known. To improve the quality, the water-resistance and the color-density of the resulting ink-absorbing layers, cationic polymers are added to these dispersions in EP-A-1013605 and DE-A-10033054. However, in highly-filled dispersions, which are particularly desired because of the improved color-matching of the resulting coating pigments, the simple addition of cationic polymers results in significant problems, for example insufficient storage stability of the dispersion.

In highly-filled dispersions, the solid particles come so close to each other that surface interaction may lead to a significant increase in viscosity and to flocculation. When cationizing the solid particles, these undesirable effects may even be reinforced. This can be explained by the fact that the quantity of cationic polymer required to cationize the particles is so large that the polymer may cause bridging of solid particles, which then leads to increased viscosity or flocculation. These highly-filled dispersions also contain significant quantities of cationic polymers, which are a further cost factor.

In addition to increasing the fill level of the dispersion, it is desirable to reduce the binder content in the coating pigment. The measures should serve to provide coating pigments with a high solids content which can be dried quickly at a given drying capacity, thus increasing the productivity of the painting machine. The ink-absorbing media obtained should also have a high color-density and a high gloss.

Ways of reducing the quantity of cationic polymers while still obtaining highly-filled, stable dispersions are therefore sought, particularly in the field of inkjet printers.

SUMMARY OF THE INVENTION

One object of the invention is therefore to provide a stable dispersion containing a smaller quantity of cationic polymers than conventional compositions.

Another object of the invention is to provide, on the basis of this dispersion, a coating pigment for an ink-absorbing medium, with high gloss and high color-density.

These and other objects have been achieved by the present invention, the first embodiment of which provides a stable, aqueous dispersion, which includes:

silicon dioxide mixed-oxide particles dispersed in at least one water-soluble cationic polymer having a mass average molar mass of less than 100,000 g/mol, said mixed-oxide including aluminum oxide or titanium dioxide, wherein said particles are produced by flame hydrolysis, wherein said particles have a BET specific surface area of 5 to 600 m$^2$/g and a negative zeta potential, and wherein the dispersion has a positive zeta potential.

Another embodiment of the invention provides a process for producing the above dispersion, which includes contacting and dispersing the silicon dioxide mixed-oxide particles and the cationic polymer in an aqueous medium.

Another embodiment of the invention provides a coating pigment for the formation of an ink-absorbing layer, which includes the above dispersion and at least one hydrophilic binder.

Another embodiment of the invention provides a process for the production of the above coating pigment, which includes contacting the above dispersion with an aqueous solution of the hydrophilic binder, stirring, and optionally diluting.

Another embodiment of the invention provides an ink-absorbing medium, which includes the above coating pigment and a carrier.

Another embodiment of the invention provides a process for the production of the above ink-absorbing medium, which includes applying the coating pigment to the carrier and drying.

BRIEF DESCRIPTION OF THE DRAWINGS

A more complete appreciation of the invention and many of the attendant advantages thereof will be readily obtained as the same becomes better understood by reference to the following detailed drawings in which like reference characters designate like or corresponding parts throughout the several views and wherein.

BRIEF DESCRIPTION OF THE PREFERRED EMBODIMENTS

Figure 1:
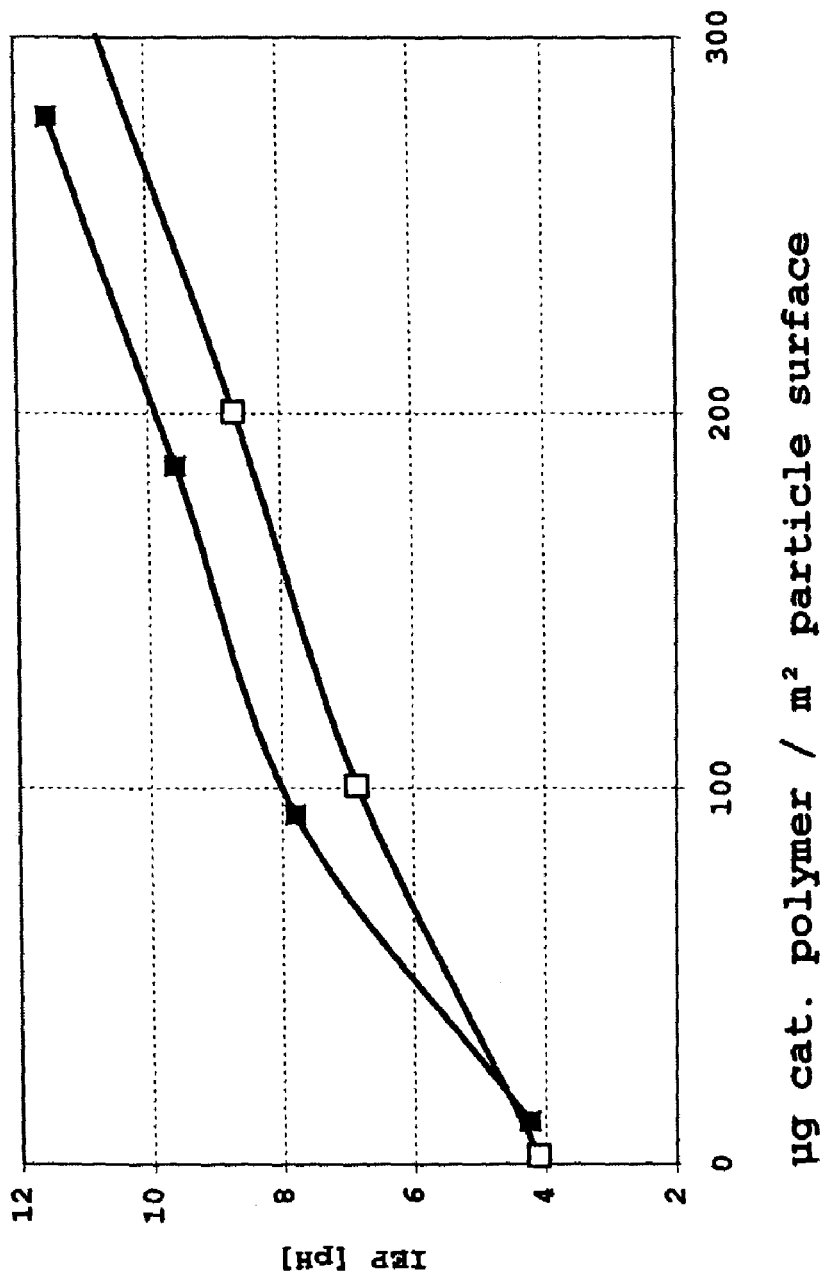
FIG. 1 shows the dependence of the isoelectric point on the quantity of cationic polymer of $SiO_2$ doped-with 0.25 wt. % $Al_2O_3$ and un-doped $SiO_2$.

Various other objects, features and attendant advantages of the present invention will be more fully appreciated as the same becomes better understood from the following detailed description, which is not intended to be limiting.

The invention preferably provides a stable, aqueous dispersion, containing silicon dioxide mixed-oxide particles produced by flame hydrolysis with aluminum oxide or titanium dioxide as the mixed-oxide component and a BET specific surface area of 5 to 600 ml/g, which has a negative zeta potential and contains a dissolved cationic polymer with a mass average molar mass of less than 100,000 g/mol, the dispersion having a positive zeta potential.

Stable is understood to mean that the dispersed mixed-oxide particles do not agglomerate, do not precipitate (e.g., they do not form sediment) in the dispersion and do not form a hard, compact deposit. The dispersions according to the invention are generally stable over a period of one month or longer.

Aqueous is understood to mean that the main constituent of the liquid phase is water. Main constituent preferably means more than 50% by weight water, which range includes 51, 52, 55, 60, 70, 80, 85, 90, 95, 96, 97, 98 and 99% by weight water.

Flame hydrolysis is understood to mean the hydrolysis of silicon and aluminum compounds or silicon and titanium compounds in the gas phase, in a flame produced by the reaction of hydrogen and oxygen. This initially produces highly disperse, non-porous primary particles, which grow together as the reaction progresses to form aggregates which can further combine to form agglomerates. The BET specific surface area of these primary particles is 5 to 600 m²/g. This range includes 6, 7, 8, 9, 10, 20, 50, 100, 250, 500, 550, 575, 585 and 595 m² g. The surfaces of these particles can have acid or basic centers. The invention also includes physical mixtures of silicon-aluminum or silicon-titanium mixed-oxides with differing contents by weight of the mixed-oxide components and/or differing BET specific surface areas.

Mixed-oxide is understood to mean the intimate mixing of silicon dioxide with the mixed-oxide component on an atomic level, the primary particles having Si—O—Al or Si—O—Ti bonds. Areas of silicon dioxide may also be present in addition to aluminum dioxide or titanium dioxide. Agglomerates produced, e.g., by flame hydrolysis as discussed herein, include associations of aggregates of primary particles. Agglomerates may dissociate into discrete aggregates, but the discrete aggregates do not dissociate into the primary particles.

These silicon dioxide mixed-oxide particles can be produced for example according to the methods disclosed in DE-A-19919635 ($SiO_2$—$Al_2O_3$), DE-A-4228711 ($SiO_2$—$Al_2O_3$) or DE-A-4235996($SiO_2$—$TiO_2$). The entire contents of each of these references is hereby incorporated by reference. Here, silicon tetrachloride and aluminum chloride or titanium tetrachloride are preferably mixed and burned together with a hydrogen-air mixture.

Silicon dioxide mixed-oxide particles can also be produced by the methods disclosed in DE-A-19650500 ($SiO_2$—$Al_2O_3$ and $SiO_2$—$TiO_2$) or DE-A-19847161 ($SiO_2$—$Al_2O_3$), provided that the proportion of the silicon dioxide or mixed-oxide component that is smaller by weight, either silicon dioxide or aluminum dioxide/titanium dioxide, does not exceed 20 wt. %. This range includes 0.1, 0.5, 0.75, 1, 2, 3, 4, 5, 7, 8, 9, 10, 11, 12, 13, 14, 15, 16, 17, 18, 19, 19.5, 19.75 and 20.0%. The entire contents of each of these references is hereby incorporated by reference. If the mixed-oxide component aluminum oxide or titanium oxide is the smaller component by weight, an aerosol produced by atomisation and containing the solution or suspension of a salt of an aluminum- or titanium compound is fed into a gas mixture containing a silicon tetrahalide, hydrogen and air, and is mixed homogeneously with this gas mixture, and the aerosol-gas mixture is then reacted in a flame in a combustion chamber. If the silicon dioxide is the smaller component by weight, the aerosol contains the salt of a silicon compound and the gas mixture contains an aluminum or titanium halide.

There are no restrictions on the quantity ratios of silicon dioxide/mixed-oxide such as $SiO_2/Al_2O_3$ or $SiO_2/TiO_2$ as long as the particles have a negative surface charge. Thus a silicon-aluminum mixed-oxide particle with 66 wt. % $Al_2O_3$, for example, has a negative zeta potential in the slightly acid to neutral pH range. This ratio includes 1, 2, 5, 7, 9, 10, 15, 20, 25, 30, 35, 40, 45, 50, 55, 60, 65, 70, 75, 80, 85, 90, 95 and 99 as appropriate.

A measure of the surface charge of the particles is the zeta potential, which can be shifted for example by cationic polymers or other substances that become attached to the surface. Zeta potential is understood to mean the potential on the shearing surface within the electrochemical double layer of mixed-oxide particle/electrolyte in the dispersion. The zeta potential depends partly on the type of particle, for example silicon dioxide, aluminum oxide, or mixed-oxide particles. An important value in connection with the zeta potential is the isoelectric point (IEP) of a particle. The IEP gives the pH value at which the zeta potential is zero. The IEP of aluminum oxide is ca pH 9 to 10, and that of silicon dioxide is less than pH 3.8.

The density of the surface charge can be influenced by changing the concentration of the potential-determining ions in the surrounding electrolyte. In dispersions in which the particles carry acid or basic groups on the surface, the charge can be changed by setting the pH value. The greater the difference between the pH value and IEP, the more stable the dispersion.

Particles of the same material will have the same surface charge sign and will thus repel each other. However, if the zeta potential is too small, the repelling force cannot compensate for the van der Waals attraction of the particles and this will lead to flocculation and in some cases sedimentation of the particles.

The zeta potential can be determined in accordance with any method known in the art and preferably for example by measuring the colloidal vibration current (CVI) of the dispersion or by determining its electrophoretic mobility.

There is no restriction on the type of cationic polymer, as long as it is soluble in the aqueous dispersion medium and has cationic properties.

Surprisingly, it was found that when using the silicon dioxide mixed-oxide particles, the quantity of cationic polymer in the dispersion in relation to silicon dioxide particles can be reduced considerably. When using a silicon dioxide doped with 0.25 wt. % aluminum oxide according to DE-A-19847161 (the entire contents of which are hereby incorporated by reference), the quantity of cationic polymer, in this case Polyquat 40U05NV (40 percent PDADMAC solution in water, PDADMAC=Poly(diallyldimethylammonium-chloride), can be reduced by 25%, in relation to the specific surface area of the particle, to achieve the same positive surface charge as with an undoped silicon dioxide. This example clearly shows that this is not an additive effect of the quantity of the mixed-oxide component aluminum oxide and the quantity of the cationic polymer. It is rather a synergistic effect between the mixed-oxide particles and the cationic polymer.

At the same time, it was found that reducing the quantity of cationic polymer produces a reduction in the viscosity of the dispersion. This shows that interactions between the particles are reduced once the quantity of cationic polymer has been reduced.

FIG. 1 shows the dependence of the isoelectric point on the quantity of cationic polymer of $SiO_2$ doped with 0.25 wt. % $Al_2O_3$ (marked with black squares ■) and un-doped $SiO_2$ (marked with white squares □). The BET specific surface area is used as a reference value to allow comparison between the particles. The unit for the quantity of cationic polymer is therefore μg cationic polymer per m² particle surface. To achieve a certain isoelectric point, up to 25% less cationic polymer in relation to the particle surface is needed with aluminum-doped silicon dioxide particles than with undoped silicon dioxide particles.

Figure 2:
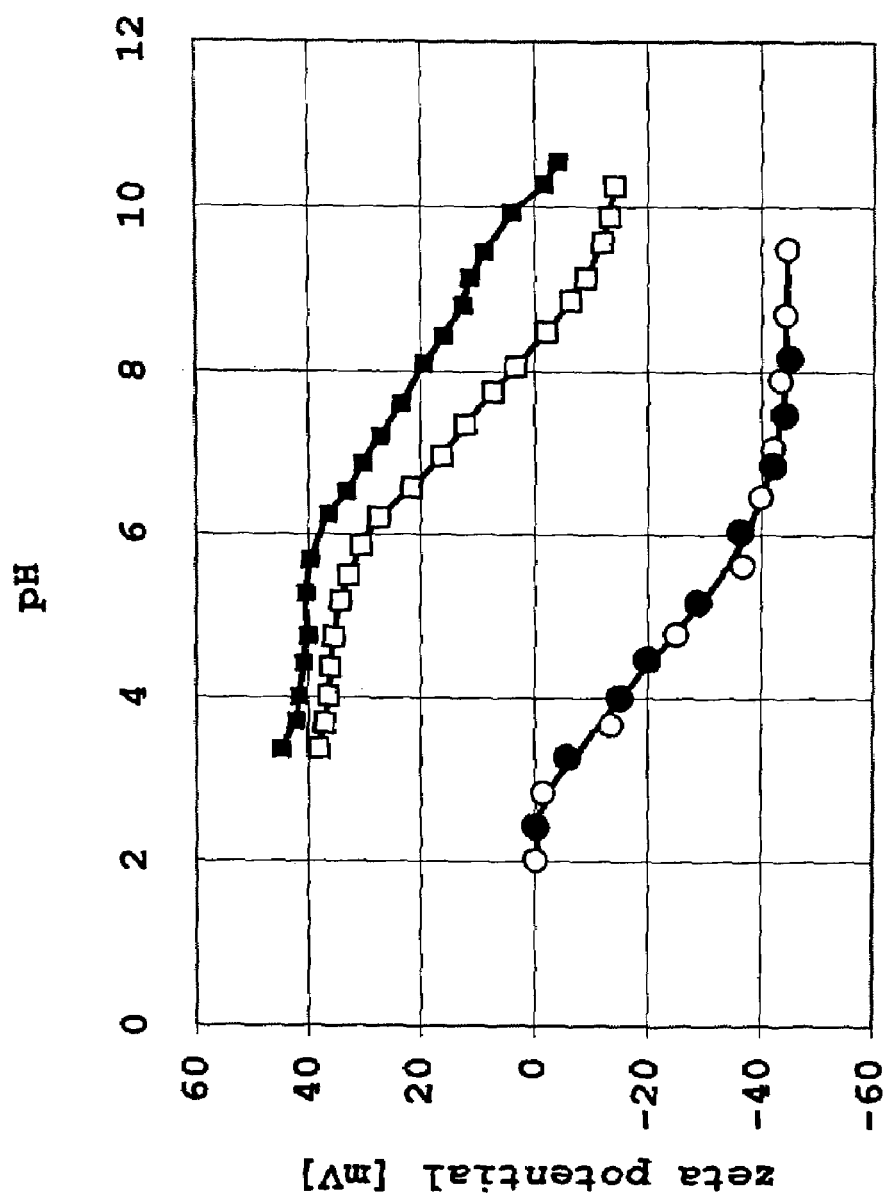
FIG. 2 shows the dependence of the zeta potential of the silicon dioxide particles doped with aluminum oxide with cationic polymer and without cationic polymer as a function of the pH value.

FIG. 2 shows the dependence of the zeta potential of the silicon dioxide particles doped with aluminum oxide with cationic polymer and without cationic polymer as a function of the pH value. The zeta potential of cationized particles is shown for 0.25 wt. % $Al_2O_3$ doped $SiO_2$ (marked with black squares ■) and un-doped $SiO_2$ marked with white squares □). The zeta potential of non-cationized particles is shown for 0.25 wt. % $Al_2O_3$ doped $SiO_2$ (marked with black circles ●) and un-doped $SiO_2$ (marked with white circles ○). A positive surface charge is first achieved in the presence of a cationic polymer. It can further be shown that, in the absence of a cationic polymer, there is virtually no difference in the course of the curve of the silicon dioxide particles doped with 0.25 wt. % aluminum oxide and the undoped silicon dioxide particles. Only in the presence of a cationic polymer is the isoelectric point of the doped particles shifted by over 2 pH units to higher values than those of the un-doped particles. Accordingly, the dispersion that contains the cationized, doped particles and the same quantity of cationic polymer in relation to the particle surface is significantly more stable.

The zeta potential curve of undoped silicon dioxide corresponds largely to that of the variant doped with small quantities of aluminum oxide. This means that small quantities of aluminum oxide are not sufficient to change the zeta potential curve significantly, until they have interacted with the cationic polymers. This may be explained by the fact that the cationic polymer may take on a different conformation on the surface of the mixed-oxide particle than on the surface of an undoped silicon dioxide and thus makes available another charge density, which is higher at the same quantity.

The zeta potential of the dispersion according to the invention is positive. It can advantageously have a value of at least +10 mV, in particular a value of at least +20 mV. In a particular embodiment the zeta potential can be at least +30 mV. This range includes 12, 14, 16, 18, 22, 24, 26, 28, 32, 34, 36, 38 and 40 mV.

To achieve a high gloss, the secondary particles of the mixed-oxide particles in the dispersion can be smaller than 0.5 μm, preferably smaller than 0.3 μm, in particular smaller than 0.2 μm. The secondary particle size can be measured by dynamic light scattering. This range includes 0.45, 0.4, 0.35, 0.25, 0.15 and 0.1 μm.

The pH value of the dispersion can be 2 to 8, preferably 2.5 to 6, in particular 3 to 5. This range includes 2.1, 2.3, 2.7, 3.1, 3.5, 4, 4.5, 5.5, 6.5, 7 and 7.5.

The solids content of the dispersion can be 10 to 70, preferably 20 to 60, in particular 30 to 50 wt. %. This range includes 15, 25, 35, 40, 45, 55, and 65 wt. %. With high-surface-area mixed-oxide particles, the solids content of a highly-filled dispersion may lie towards the lower limits, with a low-surface-area dispersion, towards the upper limits, of the given ranges.

The viscosity of the dispersion is preferably lower than 5000 mPas at a shear rate of 1 s$^{-1}$. This range includes 100, 200, 500, 1,000, 1,500, 2,000, 2,500, 3,000, 3,500, 4,000, and 4,500 mPas.

The content of cationic polymer can be 0.1 to 15, preferably 0.5 to 10, in particular 0.8 to 5 wt. % in relation to the quantity of cationic polymer and mixed-oxide particles. This range includes 0.2, 0.7, 0.9, 1, 2, 7, 9, 11, 13, and 14 wt. %.

The mass average molar mass of the cationic polymer is less than 100,000 g/mol. It is preferably in the range 2,000 to 50,000 g/mol. This range includes 1,000, 1,500, 2,500, 4,500, 5,500, 10,000, 20,000 and 50,000 g/mol.

Cationic polymers can be polymers with at least one quarternary ammonium group, phosphonium group, an acid adduct of a primary, secondary or tertiary amine group, polyethylene imines, polydiallylamines or polyallylamines, polyvinylamines, dicyandiamide condensates, dicyandiamide-polyamine co-condensates or polyamide-formaldehyde condensates. Mixtures are possible.

Those based on a diallylammonium compound, in particular those based on a dialkyldiallyl compound, which can be obtained by a radical cyclisation reaction from diallyl amine compounds and may have structure 1 or 2, are preferred.

Structures 3 and 4 are copolymers based on dialkyldiallyl compounds, in which R1 and R2 are a hydrogen atom, an alkyl group with 1 to 4 C atoms, methyl-, an ethyl-, an n-propyl, an iso-propyl, an n-butyl-, an iso-butyl or a tert-butyl group, R1 and R2 being the same or different. A hydrogen atom of the alkyl group may also be substituted by a hydroxy group. Y is a radically-polymerisable monomer unit, such as e.g. sulfonyl, acrylamide, methacrylamide, acrylic acid, methacrylic acid. X− is an anion.

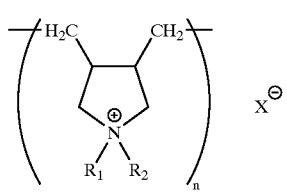

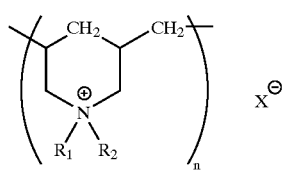

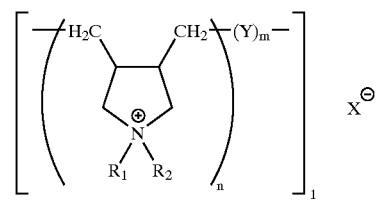

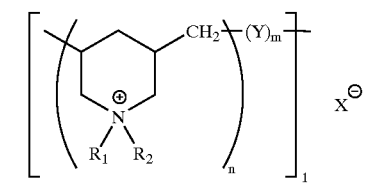

The anion, X$^-$, is not particularly limited, and any anion may be used. Examples of anions include halogens, bromine, chlorine, iodine, fluorine, nitrite, hydrogen sulfite, bicarbonate, acetate, dihydrogen phosphate, hydroxide, nitrate, and hydrogen sulfate. Combinations of anions are possible.

The n and m symbols mean that there is a repeating unit as appropriate in a polymer or copolymer. The n and m terms may each individually take on any value, including any of 1, 2, 3, 4, 5, 6, 7, 8, 9, 10, 20, 100, 250, 500, 1,000, 10,000, 100,000, 250,000, 500,000, 1,000,000, 10,000,000, 100,000,000 and combinations thereof as appropriate.

The dispersion according to the invention may optionally and additionally contain substances to set the pH value, such as acids, bases or buffer systems, additives to stabilize the dispersion, such as salts, surfactants, organic solvents, bactericides and/or fungicides. Mixtures are possible.

Another preferred embodiment of the invention further provides a process for the production of the dispersion according to the invention, which is characterized in that the mixed-oxide particles are pre-dispersed in an aqueous medium and then dispersed, the water-soluble cationic polymer being provided in an aqueous medium before pre-dispersion or being added during dispersion.

It is also possible to add the mixed-oxide particles and water-soluble cationic polymer to the aqueous medium alternately during the dispersion process.

Dissolvers or toothed gear discs, for example, are suitable for pre-dispersion. Rotor-stator machines, such as Ultra Turrax (IKA), or those manufactured by Ystral, and also ball mills or mechanically-stirred ball mills, are suitable for dispersion. Higher energy inputs are possible with a planetary kneader/mixer. However the effectiveness of this system depends on the mixture processed having a sufficiently high viscosity to incorporate the high shear energies required to disperse the particles. High-pressure homogenisers can be used to obtain aqueous dispersions with secondary particle sizes of less than 0.2 μm.

With these devices, two pre-dispersed suspension streams under high pressure are released through a nozzle. The two dispersion jets collide with each other exactly and the particles mill themselves. In another embodiment the pre-dispersion is also placed under high pressure, but the particles collide against armoured areas of wall. The operation can be repeated as often as desired to obtain smaller particle sizes.

Another preferred embodiment of the invention further provides a coating pigment for the formation of the ink-absorbing layer, which contains the dispersion according to the invention and at least one hydrophilic binder.

The following may be used as binders: polyvinyl alcohol, partially- or fully-saponified, and cationized polyvinyl alcohol containing a primary, secondary or tertiary amino group or a tertiary ammonium group on the main chain or the side chain. Also combinations of these polyvinyl alcohols with each other and polyvinylpyrrolidones, polyvinylacetates, silanised polyvinyl alcohols, styrene-acrylate-lattices, styrene-butadiene-lattices, melamine resins, ethylene-vinylacetate-copolymers, polyurethane resins, synthetic resins such as polymethyl methacrylates, polyester resins (e.g unsaturated polyester resins), polyacrylates, modified starch, casein, gelatines and/or cellulose derivatives (e.g. carboxymethylcellulose). Polyvinyl alcohol or cationized polyvinyl alcohol are preferred. Mixtures are possible.

The coating pigment may also contain one or more other pigments such as calcium carbonate, layered silicates, aluminum silicates, plastic pigments (e.g. polystryrene, polyethylene, polypropylene), silicas (e.g. colloidal silicas, precipitated silicas, silica gels, cationized variants of the stated silica compounds, aluminum compounds (for example aluminum sols, colloidal aluminum oxides and their hydroxy compounds, such as pseudo-boehmite, boehmite, aluminum hydroxide), magnesium oxide, zinc oxide, zirconium oxide, magnesium carbonate, kaolin, clay, talc, calcium sulfate, zinc carbonate, satin white, lithopones and zeolites. Mixtures are possible.

The coating pigment may have a mixed-oxide particle content of 10 to 60 wt. %. It is preferably greater than 15 wt. %, in particular greater than 25 wt. %. These ranges include 12, 14, 16, 18, 20, 30, 40, 50, 52, 54, 56 and 58 wt. %, based on the weight of the pigment.

The coating pigment may further contain a proportion of binders in relation to the mixed-oxide particles, which is 3 to 150 wt. %, preferably 10 to 40 wt. % and in particular 3 to 15 wt. %. These ranges include 4, 5, 6, 7, 8, 9, 10, 11, 12, 13, 14, 20, 60, 80, 100, 120, 140 and 145 wt. %.

To increase the water-resistance of the binder system and thus the coating, one or more crosslinkers may be used, such as zirconium oxides, boric acid, melamine resins, glyoxal and isocyanates and other molecules that bind the molecule chains of the binder system with each other.

Auxiliary agents such as optical brighteners, de-foaming agents, wetting agents, pH buffers, UV absorbers and viscosity improvers can also be used.

Another preferred embodiment of the invention further provides the production of a coating pigment, which is characterized in that the dispersion according to the invention is added, whilst stirring, to an aqueous solution of the hydrophilic binder, to which other additives may optionally be added, and optionally diluted, until the desired ratio of mixed-oxide particles to binder and the desired total solids content is obtained. The order of addition is not important. The mixture is optionally stirred for a certain time and if necessary de-aerated in a vacuum. Additives are understood to mean, for example, pigment, crosslinkers, optical brighteners, de-foamers, wetting agents, pH buffers, UV absorbers and viscosity improvers.

Another preferred embodiment of the invention further provides an ink-absorbing layer that uses the coating pigment according to the invention and a carrier. The carrier may be, for example, paper, coated paper, resin films, such as a polyester resin, including polyethylene terephthalate, polyethylene naphthalate, a diacetate resin, a triacetate resin, an acrylic resin, a polycarbonate resin, a polyvinyl chloride, a polyimide resin, cellophane, celluloid or a glass plate. Combinations are possible.

Photographic base papers, i.e. papers to the front and back of which one or more layers of polyethylene film have been applied, are preferred. Also polyester film, PVC film or pre-coated papers are suitable. Combinations are possible.

The ink-absorbing medium according to the invention also includes media in which the ink-absorbing layer consists of several coating layers of the same type or other layers. The coating pigment according to the invention may only be found in one or more layers. Thus, for example, other ink-absorptive coatings such as coatings containing precipitated silica, can be applied beneath the coating pigment according to the invention. Furthermore, one or more polymer layers (e.g. polyethylene) can be applied to the substrate and/or to the coating according to the invention, to increase the mechanical stability and/or the gloss of the coating (e.g. photographic base paper, lamination).

The carriers may be transparent or opaque. There are no restrictions on the thickness of the carrier, however thicknesses of 50 to 250 μm are preferred. This range includes 55, 75, 100, 150, 175, 200, 225, 230 and 240 μm.

Another preferred embodiment of the invention further provides the production of an ink-absorbing medium, which is characterized in that the coating pigment is applied to the carrier and dried. The coating pigment can be applied by all of the conventional application processes such as rolling blade application, blade coating, airbrushing, doctor blade (profiled, smooth, split), the cast-coating process, film pressing, bonding-pressing, curtain-coating and slot-die application (for example coating blade) and combinations thereof. Processes are preferred which allow very homogeneous coating, such as e.g. cast-coating, curtain-coating and slot-die application. The coated substrate can be dried by all of the conventional processes such as air- or convection drying (e.g. hot air channel), contact or conduction drying, energy radiation drying (e.g. infra-red and microwave).

EXAMPLES

Having generally described this invention, a further understanding can be obtained by reference to certain specific examples which are provided herein for purposes of illustration only and are not intended to be limiting unless otherwise specified.

Analytical Methods

The viscosity is determined with an MCR300 device with CC27 measuring system from Parr-Physica, measurements being taken at shear rates of 0.01 to 100 s$^{-1}$. The viscosity is given at 1 s$^{-1}$.

The zeta potential and the isoelectric point are determined with a DT-1200 device from Dispersion Technology Inc., according to the CVI process. Titration is carried out with $KOH/HNO_3$.

Particles: Silicon dioxide doped with 0.25 wt. % aluminum oxide produced to DE-A-19847161 with a BET specific surface area of 65 m$^2$/g.

Dispersions

Dispersion 1(D1)(Reference example): Silicon dioxide doped with 0.25 wt. % aluminum oxide, without cationic additive.

800 g desalinated water is provided and gradually incorporated into 600 g silicon dioxide doped with 0.25 wt. % aluminum oxide using a dissolver. Sufficient water is then added to achieve a solids content of 40%. This is then dispersed for 30 min at 7000 rpm. The pH value of the dispersion is 4.8, the viscosity 1200 mPas at 1/s. The zeta potential is measured as −19 mV by CVI. The isoelectric point of the dispersion is less than pH 3 and cannot be determined precisely (typical silica curve).

Dispersion 2 (D2)(Reference example): Silicon dioxide doped with 0.25 wt. % aluminum oxide, without cationic additive, with citric acid)

As reference example 1, except that 5 g citric acid are first dissolved in the water. The pH value of the dispersion is 4.4. Zeta potential: −26 mV iep see above.

Dispersion 3 (D3)(Reference example): Silicon dioxide and cationic Polymer 800 g de-salinated water is provided and 16.5 g Polyquat 40U05NV (40% PDADMAC solution in water, PDADMAC=Poly(diallyldimethylammoniumchlorid)) is dissolved therein. This is equivalent to an additive quantity of 200 μg/m$^2$ particle surface. 600 g silicon dioxide (Aerosil OX 50, Degussa AG, BET spec. Surface area: 55 m$^2$/g) is then incorporated in batches with a dissolver. Sufficient water is then added to achieve a solids content of 40%. This is then dispersed for a further 30 min at 7000 rpm.

Dispersion 4 (D4): Silicon dioxide doped with 0.25 wt.-% Aluminum oxide and Polyquat 40U05NV As reference example 1, except that 24.38 g Polyquat 40U05NV (40% PDADMAC solution in water, molecular weight ca 5000 g/mol, Katpol GmbH, Bitterfeld) is dissolved in the water. This is equivalent to an additive quantity of 200 μg/m$^2$ particle surface.

Dispersion 5 (D5): Silicon dioxide doped with 0.25 wt. % aluminum oxide and Polyquat 40U10

As example 1, but this time with Polyquat 40U10 (40% PDADMAC solution, 15000 g/mol, Katpol GmbH, Bitterfeld).

Dispersion 6 (D6): Silicon dioxide doped with 0.25 wt.-% aluminum oxide and Polyquat 40U50A As example 1, but this time with Polyquat 40U50A (40% PDADMAC solution, 25000 g/mol, Katpol GmbH, Bitterfeld).

Dispersion 7 (D7): Silicon dioxide doped with 0.25 wt. % aluminum oxide and Catiofast PR8153 (BASF)

As example 1, but this time with 18.1 g Catiofast PR8153 (54% solution).

Dispersion 8 (D8): Silicon dioxide doped with 0.25 wt. % aluminum oxide and Polyquat 40U05NV 35 kg de-salinated water is provided and 1 kg Polyquat 40U05NV is dissolved therein. 24 kg silicon dioxide powder doped with 0.25 wt. % aluminum oxide is then dispersed within 10 minutes through the suction nozzle of the Conti-TDS (Ystral). Dispersion is continued for a further 5 minutes.

Dispersion 9 (D9): Silicon dioxide doped with 0.25 wt. % aluminum oxide and Polyquat 40U05NV As example 8, except that 1.38 kg polymer solution and 36.5 kg powder are used so that a solids content of 50% is obtained.

The analytical data of dispersions D1 to D9 are summarised in Table 1.

TABLE 1

Analytical data for dispersions D1 to D9[1]

| Dispersion | Cationic Polymer | pH | Viscosity mPas[4] | zeta potential [mV/pH] | IEP |
|---|---|---|---|---|---|
| D1 | None | 4.8 | 1200 | −19/4.5 | <3 |
| D2[2] | none | 4.4 | 1050 | −26/4.5 | <3 |
| D3[3] | Polyquat 40U05NV | 3.1 | 42 | +36/4.5 | 8.5 |
| D4 | Polyquat 40U05NV | 2.8 | 28 | +42/4.5 | 10.1 |
| D5 | Polyquat 40U10 | 2.9 | 35 | +41/4.5 | 10.2 |
| D6 | Polyquat 40U50A | 2.7 | 34 | +39/4.4 | 9.9 |
| D7 | Catiofast PR8153 | 3.4 | 110 | +37/4.4 | 9.5 |
| D8 | Polyquat 40U05NV | 2.75 | 20 | +43/4.0 | 10.1 |
| D9 | Polyquat 40U05NV | 2.9 | 800 | +39/4.3 | 9.9 |

[1]Solids content 40 wt. %, Ex. 9: 50 wt. %;
[2]Addition of citric acid;
[3]Silicon dioxide instead of doped silicon dioxide;
[4]at 1s$^{-1}$ Coating Pigments Recipe A:

An aqueous polyvinyl alcohol solution (PVA Mowiol 40–88, Clariant) with a solids content of 12.26% is provided in a glass beaker and a quantity of water is added to it so that once dispersion D(n) is added, a coating pigment with a solids content of 34 wt. % is obtained. The relevant dispersion is added to the polyvinyl-alcohol solution and water whilst stirring with a dissolver disc at 500 rpm. Once addition is complete, stirring continues for a further 30 minutes at 500 rpm. The coating pigments are then de-areated using a desiccator and a water jet pump.

The coating pigments S(n)-A thus obtained contain 100 parts of the solids contained in dispersion D(n) (mixed-oxide particles+cationic polymer) and 3 parts PVA Mowiol 40–88.

The index n refers to dispersions D(n), coating pigments S(n) and ink-absorbing media M(n). Dispersion D1 stands for n=1, D2 for n=2 etc. The coating pigments are connected to the dispersions, i.e. coating pigment S1 results from dispersion D1, S(2) results from D2 etc. Similarly, the ink-absorbing medium M1 results from the coating pigment S1 etc.

Recipe B: As recipe A, but that the aqueous polyvinyl alcohol solution (PVA Mowiol 26–88, Clariant) has a solids content of 13.30 wt.-%. The solids content of the coating pigments is set to 26 wt. %.

The coating pigments S(n)-B thus obtained contain 100 parts of the solids contained in dispersion D(n) (mixed-oxide particles+cationic polymer) and 10 parts PVA Mowiol 26–88.

Recipe C: As recipe A. The solids content of the coating pigments is set to 26 wt. %.

The coating pigments S(n)-C thus obtained contain 100 parts of the solids contained in dispersion D(n) (mixed-oxide particles+catioinic polymer) and 8 parts PVA Mowiol 40–88.

The pH values and viscosities of the coating pigments obtained by these recipes are given in Table 2.

The viscosity data show that the coating pigments S4-A, S5-A, S8-A and S9-A obtained from dispersions D4, D5, D8 and D9 have a low viscosity combined with a very high solids content.

Ink-Absorbing Media

The coating pigments with the index A and B are applied using a 24 micrometer wet film spiral blade onto mat Inkjet-Paper (Zweckform, No. 2576). They are dried with a hairdryer. The coated paper is then satinised with a laboratory calender at 10 bar pressure and 50° C. The application weight thus obtained of the coating pigments with index A is 12 g/m², and with index B is 15 g/m².

The coated papers are printed with an internal test image on an Epson Stylus Color 980 with the settings Premium Glossy Photo Paper, 1440 dpi, bi-directional, calibration Epson, Gamma (D): 1.8.

The coating pigments with index C are applied using a 100 micrometer wet film spiral blade to a 100 micrometer thick, untreated polyester film (Benn). They are dried with a hairdryer.

The coated films are printed with an internal test image on an Epson Stylus Color 980 with the settings Photo Quality Glossy Film, 1440 dpi, calibration Epson, Gamma (D): 1.8.

The visual gloss-, adhesion- and test image impression of the ink-absorbing media produced are reproduced in Table 3.

This application is based on German application DE 10203047.2, filed Jan. 26, 2002, the entire contents of which are hereby incorporated by reference.

Obviously, additional modifications and variations of the present invention are possible in light of the above teachings. It is therefore to be understood that within the scope of the appended claims, the invention may be practiced otherwise than as specifically described herein.

The invention claimed is:

1. A stable, aqueous dispersion, comprising:
   silicon dioxide mixed-oxide particles in form of aggregated, non-porous primary particles, comprising Si—O—Al or Si—O—Ti bonds within the primary particles, said particles being the only solid matter in the dispersion, said particles being dispersed in at least one water-soluble cationic polymer having a mass average molar mass of less than 100,000 g/mol; and wherein a content of said particles in the dispersion is from 30 to 50 wt. %, and the dispersion has a viscosity of less than 5000 mPas at a shear rate of 1 s$^{-1}$.

2. The dispersion according to claim 1, wherein the positive zeta potential is at least 10 mV.

3. The dispersion according to claim 1, wherein the particles have a particle size of less than 0.5 μm.

4. The dispersion according to claim 1, which has a pH value of 2 to 8.

5. The dispersion according to claim 1, wherein the cationic polymer is present in an amount of 0.1 to 15 wt. %, based on the weight of cationic polymer and mixed-oxide particles.

6. The dispersion according to claim 1, wherein a mass average molar mass of the cationic polymer is 2,000 to 50,000 g/mol.

7. The dispersion according to claim 1, wherein the cationic polymer is selected from the group consisting of polymers containing at least one quarternary ammonium group, phosphonium group, an acid adduct of a primary, secondary or tertiary amine group, polyethylene imine, polydiallylamine polyallylamine, polyvinylamine, dicyan-

TABLE 2 pH-value and viscosity[1] of the coating pigments

| Coating pigments | S1-A | S2-A | S2-B | S2-C | S3-A | S4-A | S4-B | S4-C | S5-A | S6-A | S7-A | S7-B | S7-C | S8-A | S9-A |
|---|---|---|---|---|---|---|---|---|---|---|---|---|---|---|---|
| PH-value | 3.8 | 3.7 | 3.9 | 3.9 | 3.2 | 2.9 | 3.2 | 3.3 | 2.9 | 2.8 | 3.6 | 3.3 | 3.3 | 2.8 | 3.0 |
| Visc. | 2470 | 2060 | 2800 | 2920 | 325 | 176 | 146 | 960 | 198 | 280 | 1210 | 1160 | 960 | 140 | 192 |

[1]Brookfield viscosity at 100 RPM in mPas

TABLE 3

Visual gloss, adhesion and test image impression[1] of the ink-absorbing media.

| Ink-absorbing medium | M1-A | M2-A | M2-B | M2-C | M3-A | M4-A | M4-B | M4-C | M5-A | M6-A | M7-A | M7-B | M7-C | M8-A | M9-A |
|---|---|---|---|---|---|---|---|---|---|---|---|---|---|---|---|
| Gloss | 0 | + | + | + | 0 | + | ++/+ | ++/+ | + | 0 | 0 | +/0 | + | + | +/0 |
| Adhesion | + | + | ++ | ++ | + | + | ++ | ++ | + | + | + | ++ | ++ | + | + |
| Test print-out | 0 | +/0 | 0 | 0 | +/0 | ++ | + | + | ++ | ++ | + | +/0 | +/0 | ++ | ++ |

[1]each test print-out evaluated by three independent people: ++: very good, +: good, +/0: good to satisfactory, 0: satisfactory diamide condensate, dicyandiamide-polyamine co-condensate, polyamide-formaldehyde condensate, and combinations thereof.

8. The dispersion according to claim 1, wherein the cationic polymer is selected from the group consisting of a diallylamine polymer, a dialkyldiallylamine polymer, and combinations thereof.

9. The dispersion according to claim 1, further comprising at least one pH-setting substance selected from the group consisting of acid, base, buffer, additive to stabilize the dispersion, salt, surfactant, organic solvent, bactericide, fungicide and combinations thereof.

10. A process for producing the dispersion according to claim 1, comprising contacting and dispersing the silicon dioxide mixed-oxide particles and the cationic polymer in an aqueous medium.

11. A coating pigment for the formation of an ink-absorbing layer, comprising the dispersion according to claim 1 and at least one hydrophilic binder.

12. The coating pigment according to claim 11, wherein the content of mixed-oxide particles is 10 to 60 wt. %, based on the weight of the pigment.

13. The coating pigment composition according to claim 11, wherein the content of binder in relation to the mixed-oxide particles is 3 to 150 wt. %.

14. A process for the production of the coating pigment according to claim 11, comprising:
    contacting the dispersion with an aqueous solution of the hydrophilic binder, stirring, and optionally diluting.

15. An ink-absorbing medium, comprising the coating pigment according to claim 11 and a carrier.

16. A process for the production of the ink-absorbing medium according to claim 15, comprising applying the coating pigment to the carrier and drying.

17. The dispersion according to claim 1, wherein an alumina or titania content is less than 3 wt. %.

18. A stable, aqueous dispersion, comprising:

silicon dioxide mixed-oxide particles in form of aggregated, non-porous primary particles, comprising Si—O—Al or Si—O—Ti bonds within the primary particles, said particles being the only solid matter in the dispersion, said particles being dispersed in at least one water-soluble cationic polymer having a mass average molar mass of less than 100,000 g/mol, wherein said particles are produced by flame hydrolysis, wherein said particles have a BET specific surface area of 5 to 600 $m^2/g$ and a negative zeta potential, and wherein the dispersion has a positive zeta potential; and wherein a content of said particles in the dispersion is from 30 to 50 wt. %, and the dispersion has a viscosity of less than 5000 mPas at a shear rate of 1 $s^{-1}$.

19. A stable, aqueous dispersion, comprising:

silicon dioxide mixed-oxide particles in form of aggregated, non-porous primary particles, comprising Si—O—Al or Si—O—Ti bonds within the primary particles, said particles being the only solid matter in the dispersion, said particles being dispersed in at least one water-soluble cationic polymer having a mass average molar mass of less than 100,000 g/mol; and wherein a content of said particles in the dispersion is from 30 to 50 wt. %, and wherein the dispersion has a pH value of 2 to 8.

* * * * *